June 6, 1933.  W. ERNI  1,912,765
MACHINE FOR HANDLING GROUND MEAT IN BULK UNITS
Filed Feb. 19, 1932  3 Sheets-Sheet 3
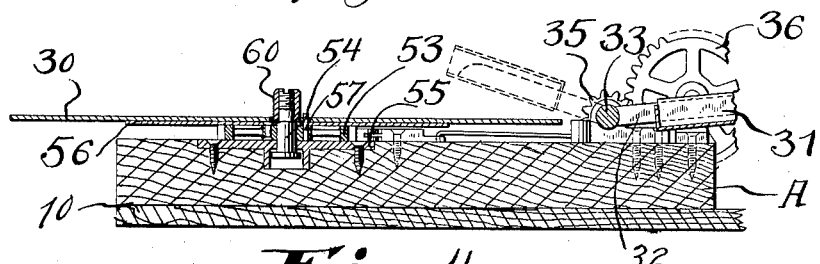
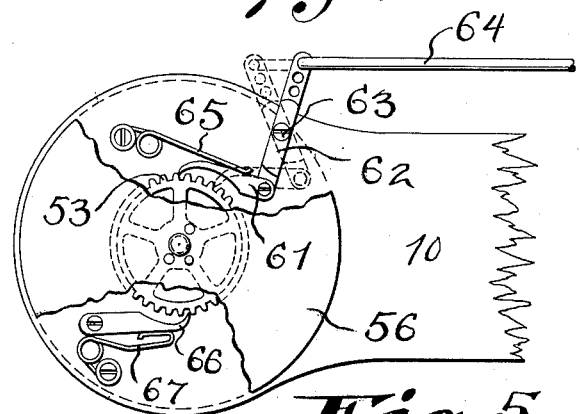
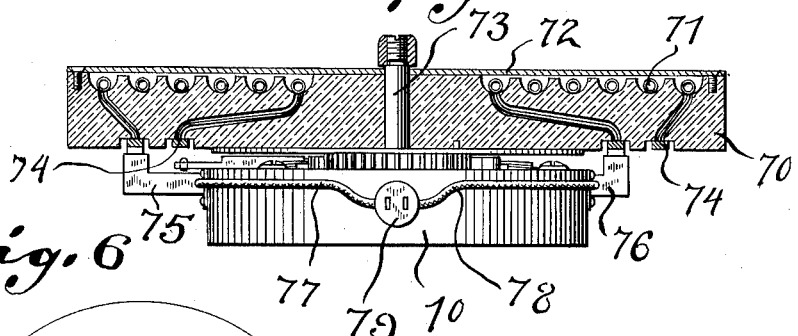
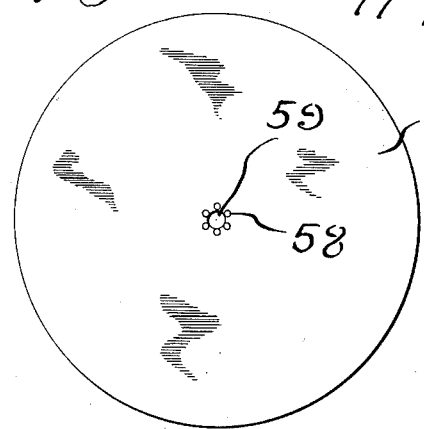
INVENTOR.
Walter Erni
BY
ATTORNEY.

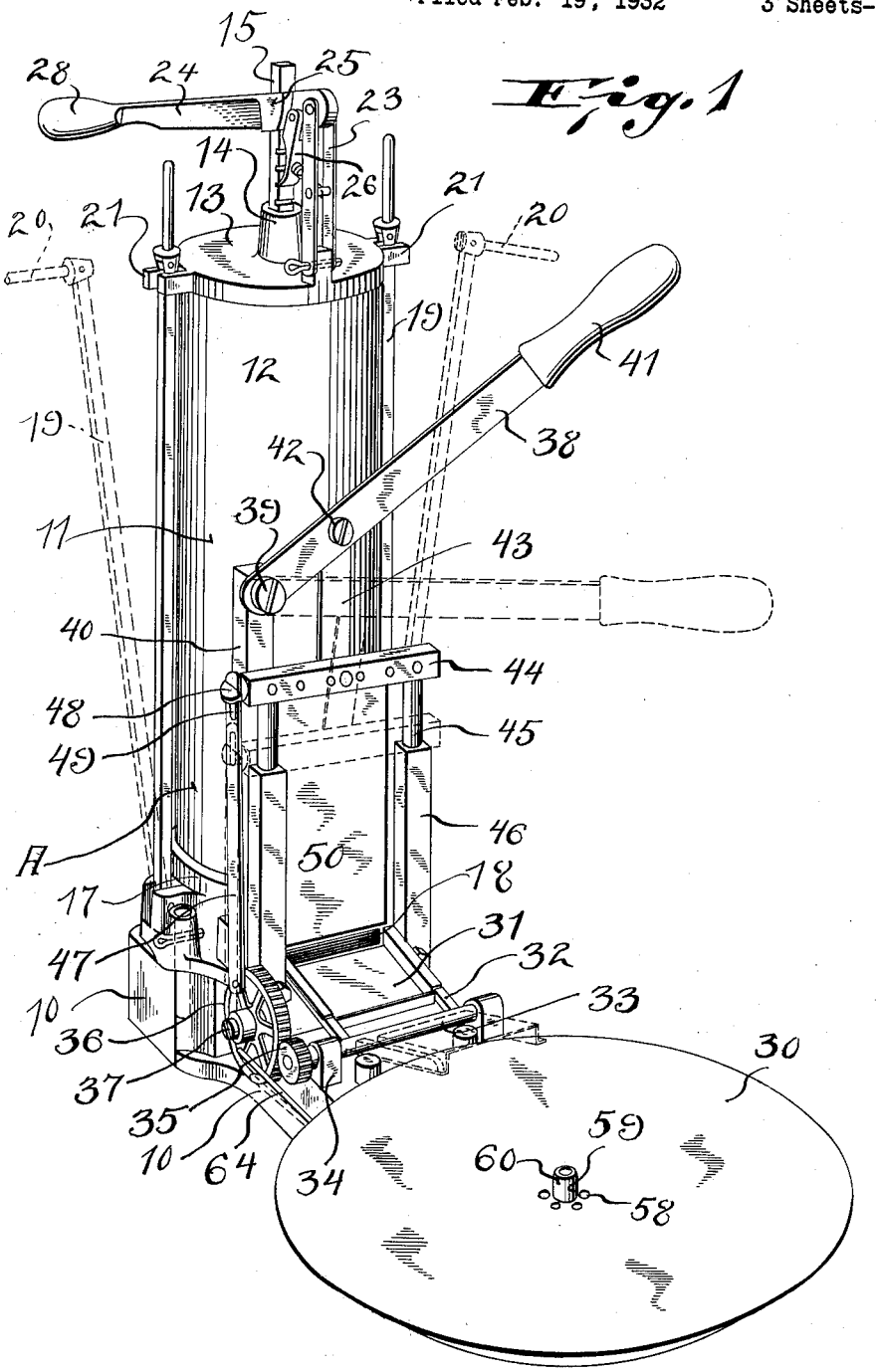

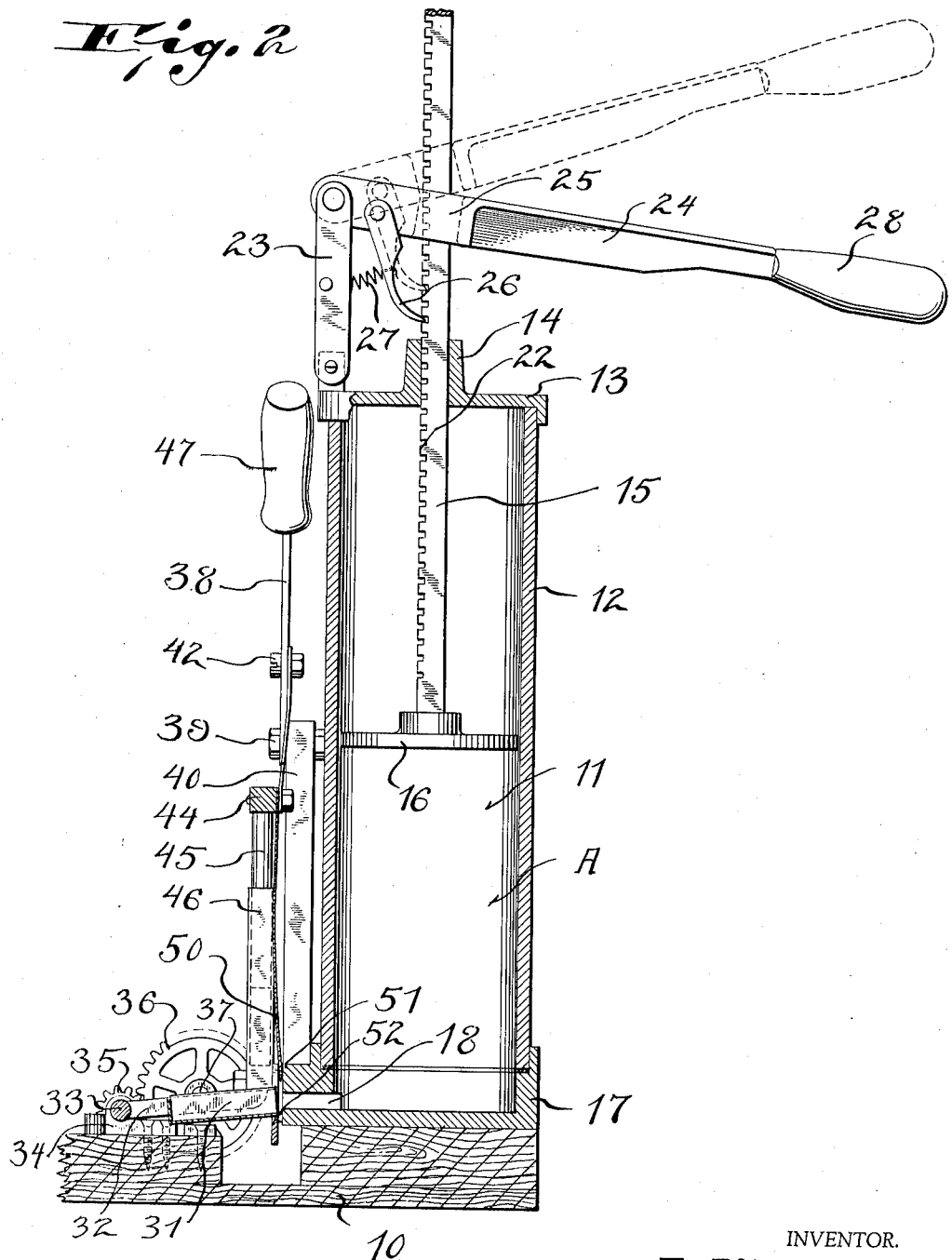

Patented June 6, 1933

1,912,765

UNITED STATES PATENT OFFICE

WALTER ERNI, OF PALMYRA, WISCONSIN, ASSIGNOR TO PALMYRA MANUFACTURING COMPANY, OF PALMYRA, WISCONSIN

MACHINE FOR HANDLING GROUND MEAT IN BULK UNITS

Application filed February 19, 1932. Serial No. 594,082.

This invention appertains to a novel device for forming and dispensing hamburger steak balls, meat patties, etc., and has for one of its objects novel means whereby the hamburger balls, patties, etc. may be readily formed and dispensed without being handled by the hands of the operator, thereby insuring the dispensing of a sanitary, palatable article of food to the purchasing public.

Another salient object of my invention is the provision of means, whereby a large number of meat balls or patties can be quickly and expeditiously formed with a minimum amount of exertion on the part of the operator, the device being of such a character, that each patty or meat ball will be of substantialy equal weight and form, so as to insure the selling of a uniform, attractive appearing article.

A further object of my invention is the provision of means whereby the meat balls or other patties will be correctly formed and severed from the meat mass without the molding of the independent meat balls or patties under pressure and in independent molds, so that the dispensing of a flat compressed cake will be eliminated.

A further important object of my invention is the provision of a dispensing cylinder for receiving the meat mass, having an outlet of predetermined shape, with a receiving carrier movably mounted in front of the opening, the cylinder having means mounted therein, whereby the meat mass will be forced from the opening and into the movable carrier.

A further object of my invention is the provision of means whereby the meat forced through the opening onto the carrier can be severed from the bulk of the meat mass, after the same has been forced into the carrier, so as to form the patty or ball.

A further important object of my invention is the provision of means for automatically actuating the carrier upon manipulation of the severing knife, so that the patty or ball will be automatically delivered to a cooking or serving plate.

A further object of my invention is the provision of novel means for mounting the serving or cooking plate in front of the carrier and for automatically revolving the plate upon actuation of the knife and carrier, so as to permit the placing of the patties or balls at spaced points around the plate.

A further important object of my invention is the provision of means for forming the plate, whereby the hamburger balls or other patties can be cooked directly on the machine in front of the carrier, and thereby insure the quick dispensing of the meat from its raw, bulky state to its completely formed cooked condition, thereby rendering the device particularly susceptible for use in hamburger sandwich stands and the like.

A still further object of my invention is to provide an improved device of the above character, which will be durable and efficient in use, one that will be simple and easy to manufacture and one which can be placed on the marked at a reasonable cost.

With these and other objects in view, the invention consists in the novel construction, arrangement and formation of parts, as will be hereinafter more specifically described, claimed and illustrated in the accompanying drawings, in which:

Figure 1 is a perspective view of my improved device;

Figure 2 is a vertical section through the same;

Figure 3 is a fragmentary vertical section through the front part of the machine, illustrating the cooking or serving plate, the meat carrier being shown in full lines in its normal position and in dotted lines in its dispensing position;

Figure 4 is a fragmentary top plan view with the serving or cooking plate removed, illustrating the novel means employed for automatically revolving the said serving or cooking plate, parts of the device being shown broken away;

Figure 5 is a diametric section through a modified form of cooking or serving plate, illustrating means for electrically cooking the patties or balls directly on the plate, as the balls or patties are placed thereon from the carrier; and, Figure 6 is a detailed top plan view of the serving or cooking plate of the type shown in Figures 2 and 3 of the drawings.

Referring to the drawings in detail wherein similar reference characters designate corresponding parts throughout the several views, the letter A generally indicates my improved dispensing device which comprises a base 10, which can be formed of any desirable material, such as wood or the like. This base 10 supports at its rear end, the dispensing cylinder 11 which arises vertically therefrom. This dispensing cylinder 11 includes the tubular body 12 having a removable head 13 detachably connected with the upper end thereof. The axial center of the removable upper head 13 is provided with a guide 14 for slidably receiving a piston rod 15. The inner end of the piston rod 15 has connected therewith, the dispensing piston 16. The lower end of the body 12 of the cylinder can be removably fitted within a bottom head 17, which head is provided at its front portion with an outlet opening 18 which can be of a predetermined form.

In order to hold the body 12 and the heads 13 and 17 of the cylinder in their proper assembled position, the lower head 17 can carry swinging clamping rods 19. These rods extend longitudinally of the body 12 and the upper ends thereof carry pivoted cam handles 20, which are adapted to engage pairs of diametrically opposed ears 21 formed on the upper head 13. Obviously, by swinging the rods 19 in engagement with the ears 21 and actuating the cam handles 20, the head 13 and the cylinder will be firmly held on the lower head 17 against displacement. When it is desired to fill the machine with the meat or material to be formed, the head 13 with the piston and piston rod and the cylinder body can be removed from the lower head 17 and the meat placed into the body, after which the parts can be returned as shown in the drawings.

To permit the effective forcing of meat from out of the cylinder through the forming throat or opening 18, one edge of the piston rod is provided with a rack bar, or rack teeth 22. Pivotally mounted on the cylinder head 13 in front of the guide 14 are swinging links 23 which pivotally carry the operating lever 24. The operating lever 24, at a point intermediate it ends is provided with a yoke 25 for slidably receiving the piston rod 15. The operating lever 24 between the yoke 25 and the links 23 has pivotally connected therewith, a dog 26, which is normally urged toward the rack bar by means of an expansion spring 27, arranged between the swinging links 23 and the said dog 26. The rear end of the operating lever 24 is provided with a manipulating handle 28.

When the piston 16 is in its raised position, the same can be forced downwardly, with sufficient pressure to urge the meat mass through the forming throat or restricted opening 18, by rocking the lever 24. On the downward stroke of the lever, the dog 16 will engage the rack teeth for pressing the piston down. On the up stroke of the lever, the dog will ride over the teeth of the rack. This construction allows the piston to be advanced in a step-by-step movement in the cylinder.

Arranged on the base in front of the throat and in spaced relation thereto, is a serving or cooking plate 30, which is preferably formed with suitable metal, such as sheet iron or steel.

This serving or cooking plate 30 is preferably of a disc-shape in plan, as is clearly shown in Figures 1 and 6 of the drawings.

Arranged between the forming throat or restricted opening 18, and the serving or cooking plate 20, is the swinging delivery carrier pan 31. This pan 31 is of a predetermined form and is connected with a pair of spaced swinging arms 32 rigidly connected with the rock shaft 33. This rock shaft 33 is supported in bearings 34 mounted on the base 10. One end of the rock shaft 33 has keyed or otherwise secured thereto, a pinion 35 which meshes at all times with a spur gear 36 arranged in rear of the rock shaft 33. This spur gear 36 is rotatably mounted on a stub shaft 37 carried by a bearing bracket arranged on the base.

To bring about the operation of the receiving or delivery pan 31, so that the patties or meat balls as formed can be delivered to the serving or cooking plate 30, I provide an operating lever 38 arranged in front of the cylinder 11. One end of the operating lever 38 is pivotally secured as at 39 to a supporting rod 40, which is in turn rigidly secured to the base or to the lower head 17 of the cylinder. The other end of the lever 38 is provided with a manipulating handle 41. The lever 38 at a point intermediate its ends has pivotally connected thereto, as at 42, a link 43 which is in turn pivotally connected to a cross head 44. This cross head has rigidly connected therewith depending guide rods 45. These guide rods 45 are slidably mounted within guide bearing blocks 46, which can be rigidly secured to the base or to the lower head 17 of the cylinder.

Eccentrically connected to the spur gear 36 is a pivoted operating rod or pitman 47 and the upper end of the rod is rockably connected to the cross head 44 by means of a pin 48. This pin is slidably mounted within a slot 49 in the operating rod 47, so that a predetermined movement can be imparted to the cross head 44 prior to the actuation of the rod 47, for a purpose, which will be later set forth. Obviously, upon downward movement of the operating lever 38, the cross head 44 will be pushed downwardly, causing the movement of the rod 47 and the partial turning of the spur gear 36. The turning of the spur gear 36 will in turn rock the shaft 33 causing the carrier pan 31 to move over the serving or cooking plate 30, to deposit the hamburger ball or other patty on the said plate.

Means is provided for initially severing the meat ball or patty from the bulk of the ground meat in the cylinder prior to the rocking of the carrier pan 31. This is accomplished by the use of a sliding cutter knife 50, which is rigidly connected to the cross head 44. The movable knife 50 depends from the cross head and its lower end is slidably mounted in guideways 51 carried by the cylinder head 17 adjacent to the outlet throat 18. This guide carries a stationary knife blade 52 for cooperation with the movable blade 50, whereby the meat can be quickly and efficiently severed. Due to the lost motion between the cross head 44 and the rod 47, the knife 50 will be actuated to cut the meat prior to the rotation of the spur gear 36. Consequently, by the time the meat has been cut, the rock shaft 33 will be rotated, causing the movement of the carrier pan.

An upward thrust of the operating lever 38 will return the various parts to their initial operative position, with the carrier pan directly in front of the delivery throat or opening 18 for receiving another meat ball or patty.

Means is also provided for rotating the serving or cooking plate 30 in a step-by-step movement, so that the periphery of the plate will move past the restricted throat, so that the meat balls or patties can be deposited at spaced points on the said plate 30. The means for rotating the plate 30 operates in conjunction with the spur gear 36 and embodies a horizontally disposed ratchet or gear wheel 53. This gear wheel 53 is rotatably mounted on an upright stub shaft or pintle 54, carried by the holding disc 55, which is securely anchored on the upper surface of the base 10 in front of the cylinder. Secured to the upper face of the gear 53 is a supporting disc 56 and the disc 56 and the gear 53 is provided with an eccentrically mounted pin 57, which is adapted to be received in any one of a plurality of openings 58 formed in the plate 30. These openings 58 are formed in the serving and cooking plate 30 around an axially formed opening 59 which receives the stub shaft or pintle 54. Threaded on the upper end of the stub shaft 54 is a lock nut 60 which extends through the axial opening 59 for bearing engagement with the supporting disc 56. By this construction, it can be seen that the serving and cooking plate 30 is removably arranged on the plate 56 for rotation therewith.

The means for bringing about the step-by-step turning movement of the plate 30 includes a pivoted pawl 61 rockably carried by the inner end of a swinging lever 62. This lever 62 is rockably mounted at a point intermediate its end on a vertical pivot 63. The outer end of the rocking lever 62 has pivotally connected therewith an actuating link or pitman 64, which extends rearwardly toward the cylinder and is eccentrically connected with the spur gear 36. A leaf spring 65 is employed for normally holding the pawl 61 in engagement with the teeth of the gear wheel 53. In order to prevent retrograde movement of the gear 53, a pivoted dog 66 is employed. This dog 66 is carried by the base 10 and is normally urged into engagement with the gear by means of a spring 67. The dog 66 is arranged opposite to the pawl 61 and consequently holds the gear against movement during the travel or back stroke of the pawl 61 over the teeth of the gear. During the initial rotation of the spur gear 36, for causing the swinging of the carrier pan over the plate 30, the link or pitman 64 moves forwardly causing the rocking of the lever 62, which brings the pawl 61 rearwardly over the teeth of the gear 53, without imparting movement thereto. Upon the return of the rod 64 and while the carrier pan is being returned to its normal position, the pawl 61 will be carried forwardly, and this pawl 61 will lock with the gear 53, causing a predetermined movement thereof, so as to carry the disc past the carrier pan to permit a clear space on the plate to be brought in operative position in front of the pan.

From the foregoing description, it can be seen that I have provided a novel means for dispensing and forming ground meat into patties and for quickly and efficiently delivering these patties to a serving or cooking plate, without the meat being handled in any way by the operator. This insures the sanitary forming of the patties and the machine can be operated directly in view of the trade, so that the purchasing public can view the machine as their sandwiches are being made.

In the actual practice, after the predetermined number of meat balls or patties have been formed and deposited on the plate 30, the same can be lifted up and the balls slid on to the cake griddle or the plate itself can be positioned over a flame for cooking the balls.

Two or three of the plates 30 can be sold with each machine, if desired. I can also provide means for cooking the meat directly on the plate 30, while the same is in its operative position in front of the carrier pan.

In Figure 5 I have illustrated such a construction. In this form, I utilize a circular disc of porcelain or other refractory material 70. The upper face of this body 70 is provided with grooves for receiving the coils 71 of the resistance wire of an electrical heating unit. These wires and the entire upper face of the body 70 can be covered by the metal cooking plate 72. The body 70 with its cooking plate 72 is detachably fitted on an axially disposed spindle 73.

This spindle 73 takes the place of a spindle 54, and the only difference being, that the spindle 73 is formed longer than the spindle 54, so as to accommodate the thickness of the body 70. The body 70 is rotated in exactly the same manner as the serving and cooking plate 30.

To impart the effective distribution of the current to the electric heating unit 71, the lower face of the body 70 has embedded therein, a pair of spaced concentric conductor rings 74. Brushes 75 and 76 are carried by the base 10, and these brushes bear against the conductor rings 74. The feed and return wires 77 and 78 for the brushes are connected to a suitable socket 79 carried by the base 10, whereby a plug from the feed wires can be connected therewith.

As stated, in this instance, the meat is cooked directly on my machine and if desired, the body 70 with its plate 72 can be removed from the machine during the serving of the meat or the meat can be simply removed therefrom by the use of a conventional griddle cake turner, or the like.

I lay particular stress on the fact that in my machine, the meat balls or patties are not formed in molds under pressure. Consequently, the meat is not unduly packed. With my machine, the meat is fed in a continuous stream and cut into sections only after the meat has been delivered through the forming throat into the carrier pan.

Changes in details may be made without departing from the spirit or the scope of my invention, but what I claim as new is:

1. In a device for forming and dispensing meat balls and patties, a hollow body for receiving a mass of the material to be dispensed having an outlet throat of predetermined form, a serving plate arranged in front of the body, a movable carrier pan of predetermined form normally disposed directly in front of the throat and movable over the plate, means for forcing the material in the body through the throat and onto the pan, a cross head slidably mounted above the throat, a depending cutting knife carried by the cross head movable past the throat, means for operating the cross head, a rock shaft, means securing the carrier pan to the rock shaft, and means for operating the rock shaft including a link operatively connected to the cross head.

2. In a device for forming and dispensing meat balls and patties, a hollow body for receiving a mass of the material to be dispensed having an outlet throat of predetermined form, a serving plate arranged in front of the body, a movable carrier pan of predetermined form normally disposed directly in front of the throat and movable over the plate, means for forcing the material in the body through the throat and onto the pan, a cross head slidably mounted above the throat, a depending cutting knife carried by the cross head movable past the throat, means for operating the cross head, a rock shaft, means for securing the carrier pan to the rock shaft, and means for operating the rock shaft including a link operatively connected to the cross head, said link having a sliding and pivotal connection with the cross head.

3. In a device for dispensing and forming meat balls and patties, a hollow body for receiving a mass of the material to be dispensed having an outlet forming throat, a serving plate arranged in front of the body, a carrier pan normally disposed in front of the throat for receiving material therefrom and movable over the plate, means for forcing the material through the throat and into the pan, a cross head slidably mounted above the throat, a depending cutting knife secured to the cross head for movement past the throat, means for operating the cross head, a rock shaft arranged between the knife and the serving plate, means connecting the pan with the rock shaft, a stub shaft, a spur gear on the stub shaft, a pinion keyed to the rock shaft, meshing with the spur gear, and a link eccentrically connected with the spur gear and pivotally and slidably connected with the cross head.

4. In a device for dispensing and forming meat balls and patties, a hollow body for receiving a mass of material to be dispensed having an outlet forming throat, a serving plate arranged in front of the body, a carrier pan normally disposed in front of the throat for receiving material therefrom and movable over the plate, means for forcing the material through the throat and into the pan, a cross head slidably mounted above the throat, a depending cutting knife secured to the cross head for movement past the throat, means for operating the cross head, a rock shaft arranged between the knife and the serving plate, means connecting the pan with the rock shaft, a stub shaft, a spur gear on the stub shaft, a pinion keyed to the rock shaft meshing with the spur gear, and a link eccentrically connected with the spur gear and pivotally and slidably connected with the cross head, means for rotatably supporting the serving plate, and means for rotating the plate in a step-by-step movement from the spur gear.

5. In a device for dispensing and forming meat balls and patties, a hollow body for receiving a mass of the material to be dispensed having an outlet forming throat, a serving plate arranged in front of the body, a carrier pan normally disposed in front of the throat for receiving material therefrom and movable over the plate, means for forcing the material through the throat and into the pan, a cross head slidably mounted above the throat, a depending cutting knife secured to the cross head for movement past the throat, means for operating the cross head, a rockable shaft arranged between the knife and the serving plate, means connecting the pan with the rock shaft, a stub shaft, a spur gear on the stub shaft, a pinion keyed to the rock shaft meshing with the spur gear, and a link eccentrically connected with the spur gear and pivotally and slidably connected with the cross head, means for rotatably supporting the serving plate, means for rotating the plate in a step-by-step movement from the spur gear, said means for operating the serving plate including a ratchet wheel arranged below and connected with the plate, a rocking lever mounted at one side of the ratchet wheel, a pivoted spring pressed pawl carried by the inner end of the lever normally urged toward the ratchet wheel, a dog oppositely disposed relative to the pawl engaging the ratchet wheel, and a rod pivotally connected to the outer end of the rocking lever and eccentrically connected to the spur gear.

6. In a device for forming and dispensing meat balls or patties, a cylinder having an outlet forming throat, means including a piston for forcing the material from the cylinder through the throat, a swinging carrier pan arranged in front of the throat, means for severing the material forced from the throat onto the pan from the bulk of the material in the cylinder, a serving plate for receiving the cut material from the pan, means for supporting the plate including a vertically disposed pivot, a supporting disc arranged on the pivot having an eccentrically disposed pin, and said plate having an axially disposed opening for receiving the pivot and a plurality of spaced openings for selective engagement with the pin.

7. In a device for forming and dispensing meat balls and patties, a cylinder having an outlet forming throat, a carrier pan arranged directly in front of the throat for receiving the material therefrom, means for forcing material through the throat, means for severing the material delivered to the pan from the bulk of the material in the body, a rotatable serving plate arranged in front of the body for receiving the material from the pan, means for rotating the plate in a step-by-step movement, means for cooking the material delivered to the plate including an electric heating coil arranged directly below the plate and movable therewith, a pair of stationary brushes arranged below the electric heating coil, a pair of spaced contact rings movable with the heating coil engaging the brushes, and means electrically connecting the conductor rings with the resistance coil.

8. In a device for forming and dispensing meat balls or patties, a hollow body for receiving a mass of material to be dispensed having a horizontal outlet throat of predetermined form, a serving plate arranged in front of the body, a carrier pan normally disposed in front of the throat in substantially horizontal plane between the body and the plate mounted for swinging movement over the plate, a movable knife for severing the material delivered to the pan from the bulk of the material to the body, means for actuating the knife, and means for swinging the carrier pan after actuation of the knife from the knife operating means.

9. In a device for forming and dispensing meat balls and patties, a cylinder having a horizontally disposed forming throat, a pan rockably mounted in front of the cylinder normally below and directly in front of the throat and lying in a substantially horizontal plane, means for forcing the material through the throat onto the pan, means for severing the material delivered to the pan from the bulk of the material in the cylinder, a rotatable serving plate mounted in front of the cylinder for receiving the cut material from the pan, means for swinging the pan in an arc of a circle over the plate, and means for cooking the severed material directly on said plate.

In testimony that I claim the foregoing I have hereunto set my hand at Milwaukee, in the county of Milwaukee and State of Wisconsin.

WALTER ERNI.